W. LANGE.
SPRAYING NOZZLE.
APPLICATION FILED APR. 2, 1920.

1,390,048.

Patented Sept. 6, 1921.
2 SHEETS—SHEET 1.

WITNESSES

INVENTOR
William Lange.
BY
ATTORNEYS

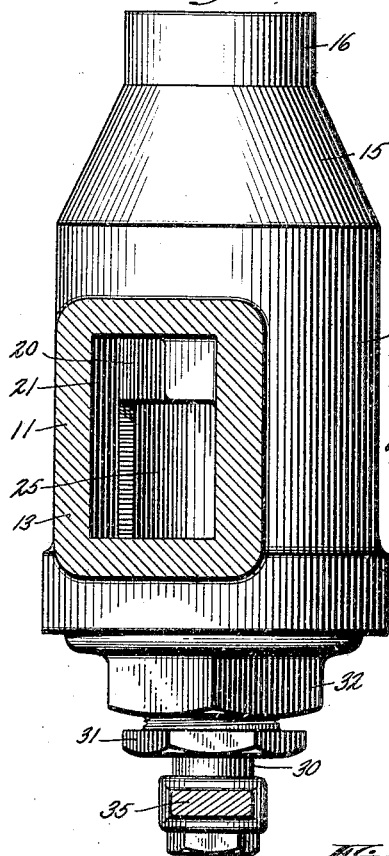
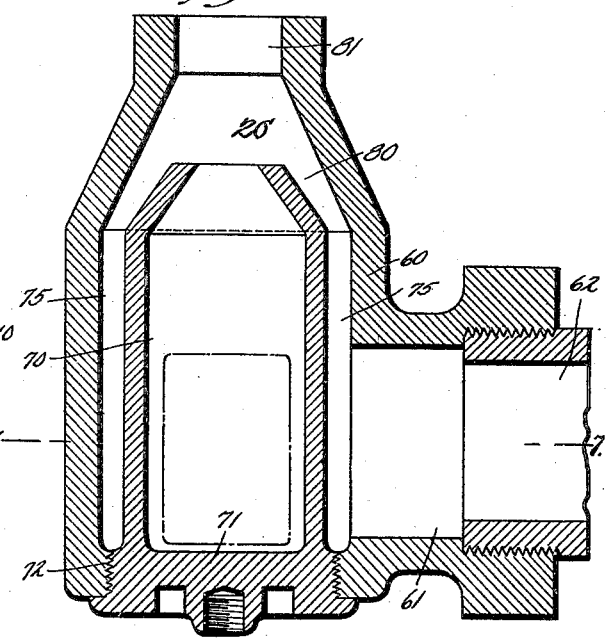
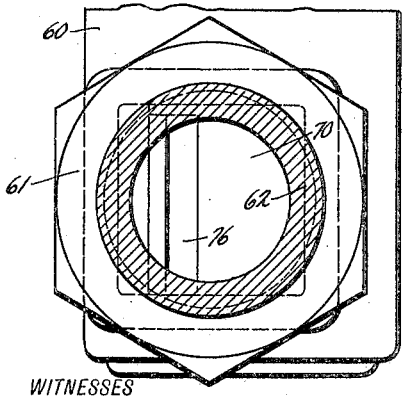
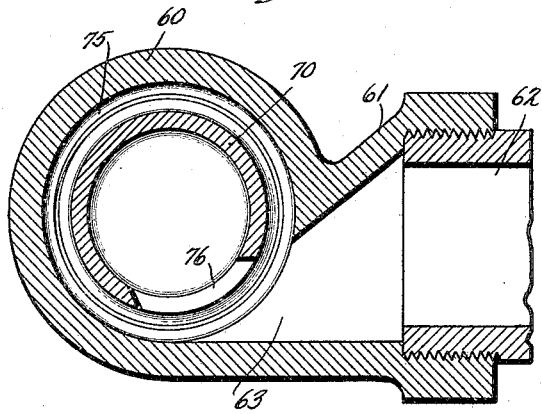

UNITED STATES PATENT OFFICE.

WILLIAM LANGE, OF NEW YORK, N. Y.

SPRAYING-NOZZLE.

1,390,048.   Specification of Letters Patent.   Patented Sept. 6, 1921.

Application filed April 2, 1920. Serial No. 370,762.

*To all whom it may concern:*

Be it known that I, WILLIAM LANGE, a citizen of the United States, and a resident of the city of New York (Stapleton, borough of Richmond), in the county of Richmond and State of New York, have invented a new and Improved Spraying-Nozzle, of which the following is a full, clear, and exact description.

The object of the invention is to provide a new and improved spraying nozzle more especially designed for use in connection with refrigerating apparatus and similar apparatus, and arranged to insure a thorough spraying of hot water or other liquid into the air to effect rapid cooling of the water for reuse in the apparatus.

Another object is to permit of readily adjusting the nozzle with a view to spray the liquid in either a fine or coarse mist.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Fig. 4 is a cross section of the same on the line 4—4 of Fig. 1;

Fig. 5 is a longitudinal central section of a modified form of the improved spraying nozzle;

Fig. 6 is an end view of the same with the supply pipe shown in section; and

Fig. 7 is a sectional plan view of the same on the line 7—7 of Fig. 5.

Figure 1:
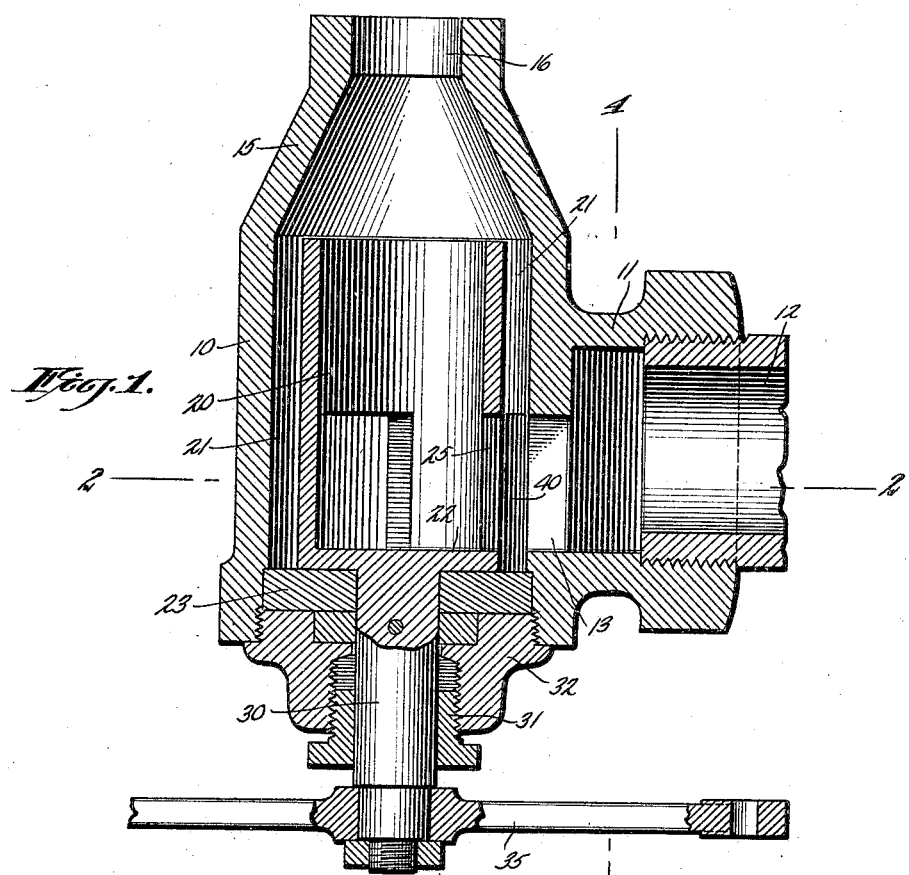
Figure 1 is a longitudinal central section of the improved spraying nozzle.
Figure 2:
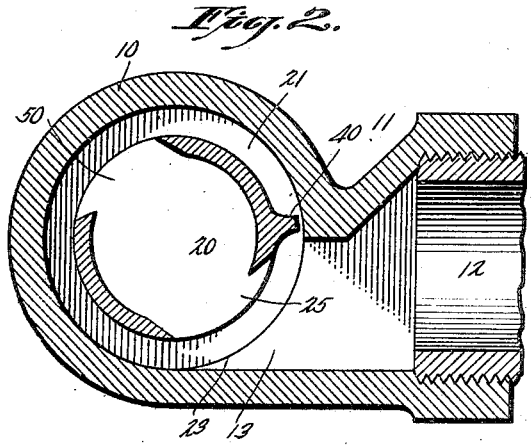
Fig. 2 is a sectional plan view of the same on the line 2—2 of Fig. 1.
Figure 3:
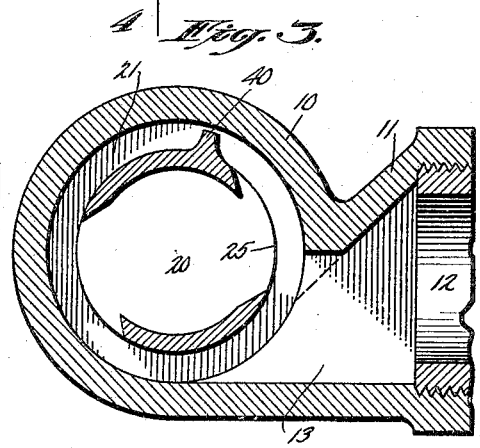
Fig. 3 is a similar view of the same with the central chamber in a different position.

The spraying nozzle illustrated in Figs. 1, 2, 3 and 4, comprises a main chamber 10 of cylindrical shape provided at one side with an inlet 11 connected by a pipe 12 with a supply of hot water or other liquid to be sprayed. The inlet 11 is provided with an inlet opening 13 which is tangentially at the outer portion and its width is considerably less than the diameter of the main chamber 10 so that water passing tangentially into the chamber 10 by way of the entrance opening 13 receives a swirling action inside of the chamber. The main chamber 10 has its upper end 15 gradually reduced and terminating in an outlet 16 opening into the surrounding air.

Within the main chamber 10 is arranged concentrically a central chamber 20 forming with the main chamber 10 an annular passage 21. The central chamber 20 is provided with a closed bottom 22 seated on the closed bottom 23 of the main chamber 10, and the central chamber 20 is provided at one side with an inlet opening 25 opposite the inlet opening 13 to permit some of the liquid passing through the inlet opening 13 to pass into the central chamber 20 by way of the inlet opening 25. One side wall of the inlet opening 25 is approximately tangential to the inner surface of the central chamber so that the liquid passing into this chamber receives a swirling action inside of the chamber and a portion of the water passing into the passage 21 likewise receives a swirling action. It will be noticed that the water whirls and rotates in the annular passage 21 at a lower speed than the water whirling and rotating in the central chamber 20, and as the upper ends of the central chamber 20 and the annular passage 21 both open into the upper reduced end 15 of the main chamber 10, it is evident that an intimate mixing of the two bodies of water takes place whereby the spraying of the water is facilitated, that is, the water is sprayed into the surrounding air in an exceedingly fine mist.

In order to permit of regulating the degree of fineness of the mist, the chamber 20 is made adjustable to change the inlet 25 relative to the entrance opening 13, and for this purpose the bottom 22 of the central chamber 20 is provided with a depending stem 30 journaled in the bottom 23 of the main chamber 10 and in a stuffing box 31 mounted in a cap 32 screwing into the lower end of the main chamber 10 to support the bottom 23 thereof. On the lower outer end of the stem 30 is secured a handle 35 adapted to be turned by an operator or connected with a distant actuating mechanism to permit of turning the central chamber 20 with a view to change the inlet opening 25 relative to the entrance opening 13, as will be readily understood by reference to Figs. 2 and 3. It will be noticed that when the central chamber 20 is moved from the position shown in Fig. 2 into the position shown in Fig. 3 then the central chamber is in a somewhat cut-off position, that is, the amount of water passing into the central chamber is reduced and a less swirling action is produced in the chamber. By this arrangement a coarser spray is discharged into the atmosphere.

In order to prevent water from flowing into the annular passage 21 in the wrong direction, the rear of the central chamber 20 is provided adjacent the rear wall of the inlet opening 25 with a cut-off rib 40 extending approximately the height of the openings 13 and 25, as indicated in Fig. 1. In order to further reduce the swirling action of the water in the central chamber 20 and the passage 21 use is made of an outlet opening 50 formed in the side of the central chamber 20 approximately diametrically opposite the inlet opening 25. It will be noticed that a portion of the water passing into the central chamber 20 passes out of this outlet 50 into the annular passage 21 thereby retarding the speed thereof and likewise that of the water in the central chamber 20. The spray produced by this arrangement is comparatively coarse and formed of large drops.

Instead of having the central chamber 20 adjustable as described, use may be made of a stationary central chamber as illustrated in Figs. 5, 6 and 7. In this case the main cylindrical chamber 60 is provided with an inlet 61 connected by a pipe 62 with a hot water supply and the inlet 61 is provided with an inlet opening 63 leading tangentially into the main chamber 60. Within the main chamber 60 is concentrically arranged a central chamber 70 having a closed bottom 71 provided with an exterior screw thread 72 screwing into the lower end of the main chamber 60. The central chamber 70 forms with the main chamber 60 an annular passage 75, and one side of the central chamber 70 is provided with a tangential opening 76 located opposite the inlet opening 63 so that a portion of the water passes into the annular passage 75 and receives a swirling action therein, and another portion of the incoming water passes through the inlet 76 and receives a swirling action in the central chamber 70. The upper end of the central chamber 70 is in the form of a nozzle 75 which discharges into the outlet 81 of the reduced upper end 80 of the main chamber 60 to form a solid cone-shaped spray of the water sprayed into the surrounding atmosphere. It is understood that the swirling water in the central chamber 70 travels at a higher speed than the water in the passage 75 and hence when the water leaves the central chamber 70 it collides with the water passing out of the upper end of the central passage 75 thus insuring a thorough dividing of the water and a consequent fine spraying of the water into the surrounding atmosphere.

Having thus described my invention, I claim as new and desire to secure by Letters Patent:—

1. A spraying nozzle, comprising two concentric chambers forming an annular passage between them, means for delivering liquid approximately tangential to the said passage and the inner chamber to produce independent whirling actions of the liquids in the said passage and the said inner chamber, the outer chamber having a contracted outlet at the top and the said inner chamber discharging at its top into the outer chamber intermediate the said passage and the said outlet.

2. A spraying nozzle, comprising a main chamber provided at one side with an approximately tangential main inlet connected with a liquid supply, the said main chamber having a reduced outlet at the top and a central chamber within the said main chamber and forming an annular passage with the same, the said central chamber having an approximately tangential inlet at one side opposite the said main inlet, the said central chamber being open at the top and opening into the said main chamber below the outlet thereof.

3. A spraying nozzle, comprising a main chamber provided at one side with an approximately tangential main inlet connected with a liquid supply, the said main chamber having a reduced outlet at the top and a central chamber within the said main chamber and forming an annular passage with the same, the said central chamber having an approximately tangential inlet at one side opposite the said main inlet, the said central chamber being open at the top and opening into the said main chamber below the outlet thereof, the said central chamber having an outlet approximately opposite the said inlet of the central chamber and opening into the said passage below the upper end thereof.

4. A spraying nozzle, comprising a main chamber provided at one side with an approximately tangential main inlet connected with a liquid supply, the said main chamber having a reduced outlet at the top and a central chamber within the said main chamber and forming an annular passage with the same, the said central chamber having an approximately tangential inlet at one side opposite the said main inlet, the said central chamber being open at the top and opening into the said main chamber below the outlet thereof, and means for turning the said central chamber within the said main chamber.

5. A spraying nozzle, comprising a main chamber provided at one side with an approximately tangential main inlet connected with a liquid supply, the said main chamber having a reduced outlet at the top and a central chamber within the said main chamber and forming an annular passage with the same, said central chamber having an approximately tangential inlet at one side opposite the said main inlet, the said central chamber being open at the top and opening into the said main chamber below the outlet thereof, the said central chamber being provided with a vertical rib extending into the said passage adjacent the main inlet.

6. A spraying nozzle, comprising a cylindrical main chamber closed at the bottom and having a contracted outlet at the top and having a tangential main inlet at the side adjacent the closed bottom, a cylindrical chamber arranged centrally in the said main chamber and forming with the latter an annular passage, the said central chamber having a closed bottom and a tangential inlet at the side opposite the said main inlet, the open top of the said central chamber opening into the upper end of the said main chamber.

7. A spraying nozzle, comprising a cylindrical main chamber closed at the bottom and having a contracted outlet at the top and having a tangential main inlet at the side adjacent the closed bottom, a cylindrical chamber arranged centrally in the said main chamber and forming with the latter an annular passage, the said central chamber having a closed bottom and a tangential inlet at the side opposite the said main inlet, the open top of the said central chamber opening into the upper end of the said main chamber, the said central chamber having an outlet diametrically opposite the said inlet of the central chamber, and the said central chamber having a rib adjacent the rear wall of its inlet opening extending into the lower portion of the said passage.

8. A spraying nozzle, comprising a cylindrical main chamber closed at the bottom and having a contracted outlet at the top and having a tangential main inlet at the side adjacent the closed bottom, a cylindrical chamber arranged centrally in the said main chamber and forming with the latter an annular passage, the said central chamber having a closed bottom and a tangential inlet at the side opposite the said main inlet, the open top of the said central chamber opening into the upper end of the said main chamber, the said central chamber having an outlet diametrically opposite the said inlet of the central chamber, and the said central chamber having a rib adjacent the rear wall of its inlet opening extending into the lower portion of the said passage, the said central chamber having a stem journaled in the bottom of the main chamber and an operating connection on the said stem for turning the central chamber.

WILLIAM LANGE.